April 15, 1958     S. DOMESHEK     2,830,491
PHOTOGRAPHIC ORTHO PROJECTOR
Filed Dec. 29, 1953     3 Sheets-Sheet 1

INVENTOR
SOL DOMESHEK
BY
R. J. Tompkins
ATTORNEYS

INVENTOR
SOL DOMESHEK

United States Patent Office 2,830,491
Patented Apr. 15, 1958

2,830,491

PHOTOGRAPHIC ORTHO PROJECTOR

Sol Domeshek, Great Neck, N. Y.

Application December 29, 1953, Serial No. 401,099

18 Claims. (Cl. 88—24)

(Granted under Title 35, U. S. Code (1952), sec. 266)

The invention described herein may be manufactured and used by or for the Government of the United States of America for governmental purposes without the payment of any royalties thereon or therefor.

This invention relates to a training device requiring detailed terrain information and involves projecting photographic detail on terrain models to provide visualizations of actual land areas.

A primary object of the invention is to provide a device that will transfer graphic information from a two-dimensional medium to a three-dimensional medium.

Another object of the invention is to obtain an effective training and briefing medium to be used for instruction for those requiring detailed terrain information.

Another object of the invention resides in the provision of a method and means whereby transfer to the three-dimensional surface to yield acceptable photographs is accomplished without requiring excessively long exposures and without error.

Yet another object of the invention is the provision of a projection system in which the cone of projection is very narrow whereby displacement errors due to relief are decreased as the cone approaches a cylinder.

And another object of the invention is to provide means to control the intensity of illumination to provide even exposure of the transparency.

Still another object of the invention is to provide a device that may be used for orthogonal photography as well as for orthogonal projection.

A corollary object of the invention is to convert by orthophotography three-dimensional objects into two-dimensional form and thereby effect a considerable savings in the time required for drafting, for map preparation, and the like.

A more specific object of the invention is to eliminate any evidence of scan when the device is used.

And another specific object of the invention is to provide uniform negative exposure.

Figures 1, 6:
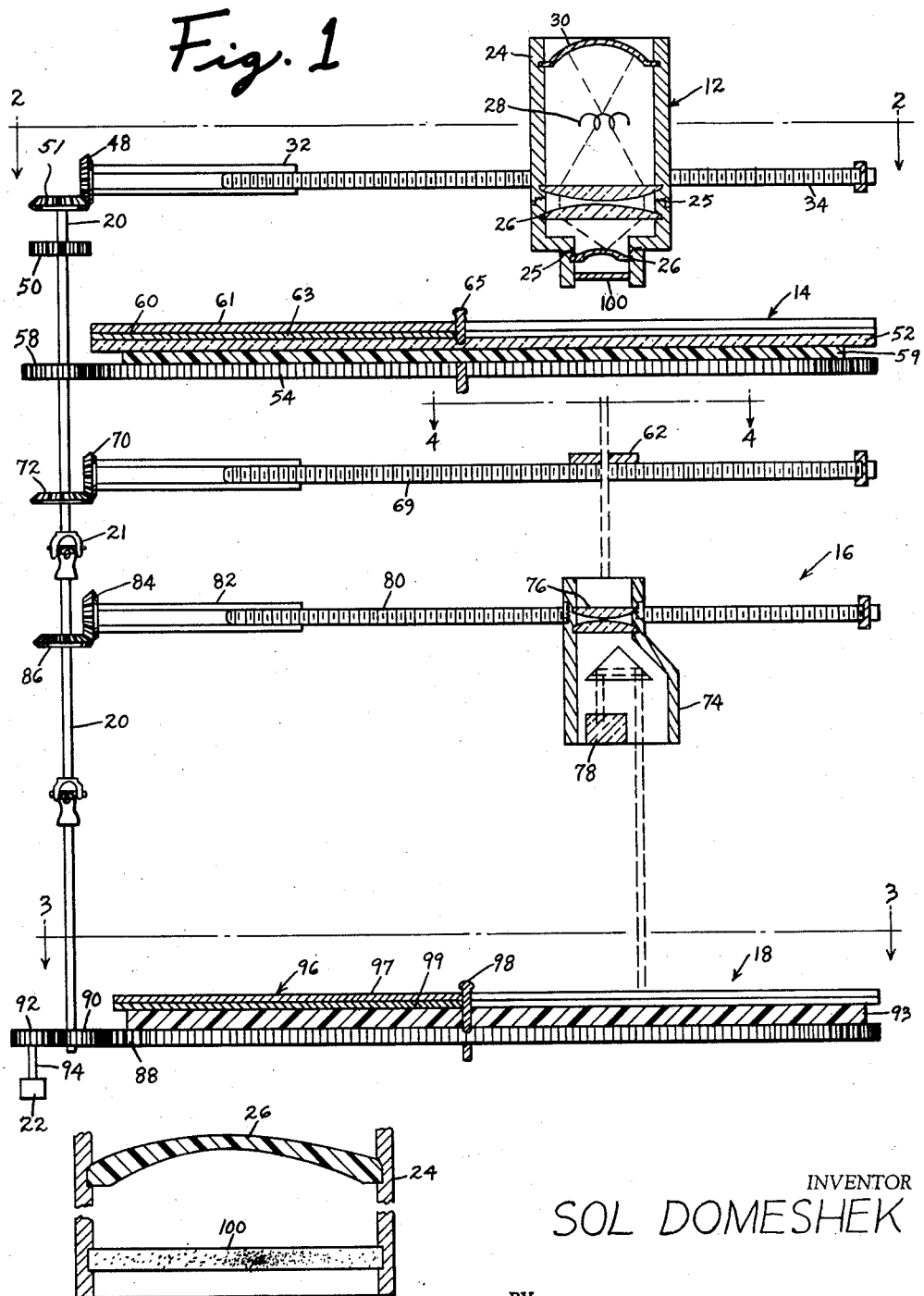
Figure 2:
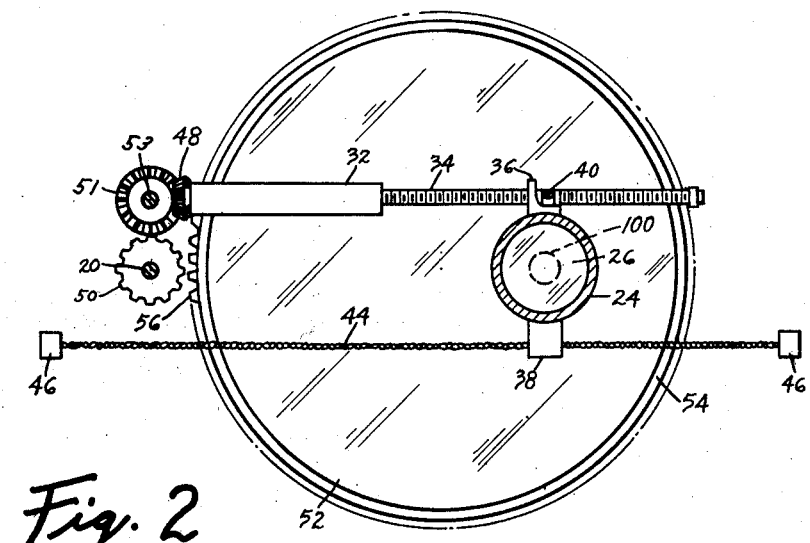
Figure 3:
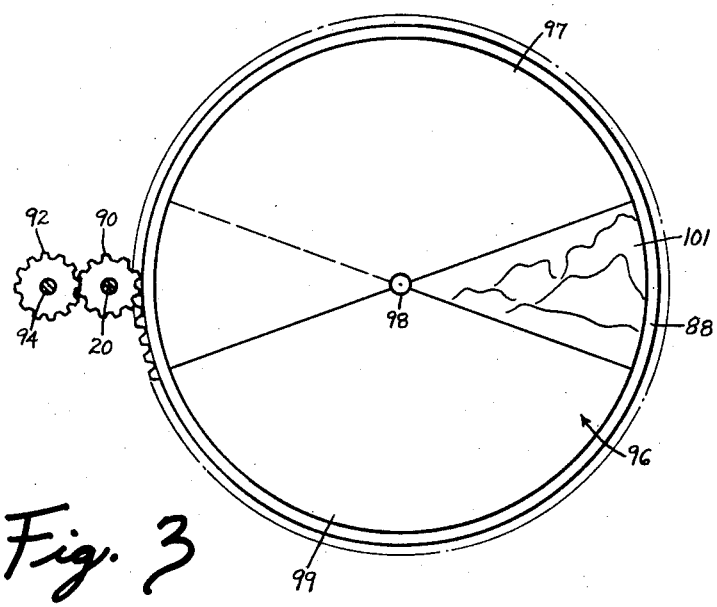
Figure 5:
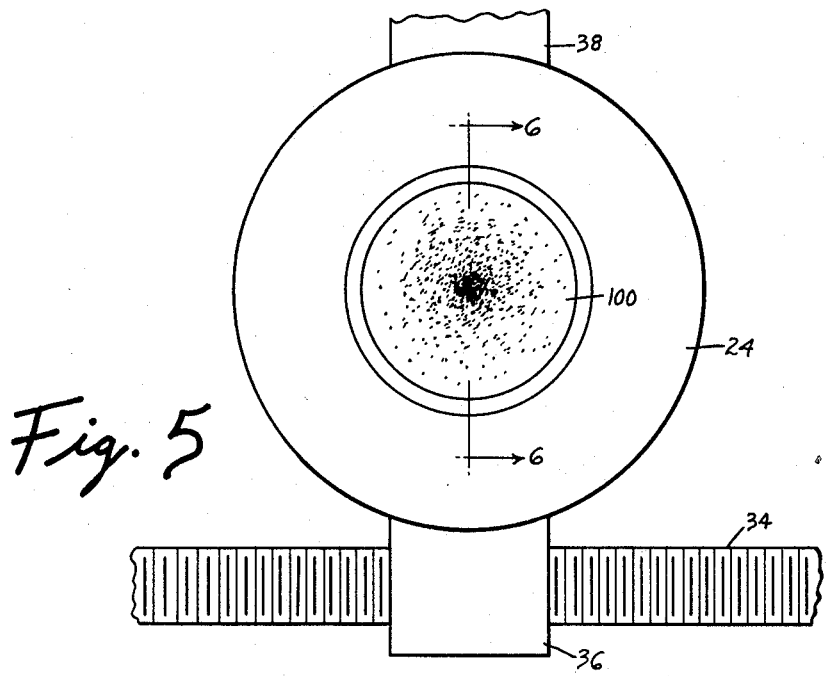
Figure 4:
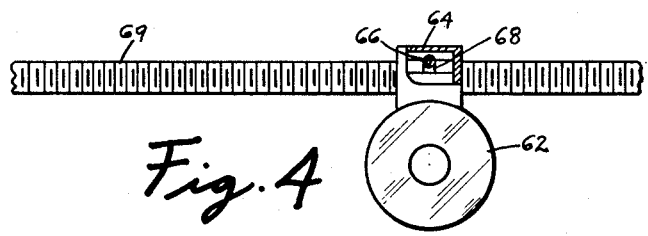
Figure 7:
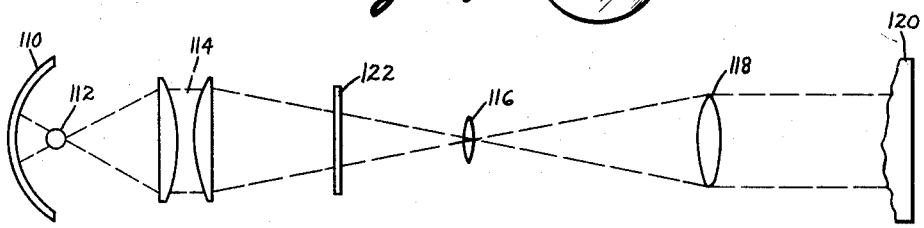

Other objects and many of the attendant advantages of this invention will be readily appreciated as the same becomes better understood by reference to the following detailed description when considered in connection with the accompanying drawings wherein:

Fig. 1 is a vertical section of the device of the invention,

Fig. 2 is a horizontal view of the lighting means and the negative plate below, with the light shield removed, and is taken on line 2—2 of Figure 1, Fig. 3 is a horizontal view taken on line 3—3 of Figure 1 and illustrates the holding means for the terrain model, Fig. 4 is a fragmentary section showing the exposure spot diaphragm and is taken on line 4—4 of Fig. 1, Fig. 5 is a bottom plan view of the variable filter disk inserted at the outlet end of the lamp housing, Fig. 6 is a section taken on line 6—6 of the filter disk illustrated, and Fig. 7 illustrates schematically a modification of the optical projection assembly.

It is desirable to train individuals requiring knowledge of detailed terrain information as rapidly as possible. Obviously, training can be accomplished by training directly over the actual terrain. But such training limits the number of personnel to be taught and also requires the physical presence at the site of the training area. The invention is designed to avoid such procedures while increasing the total number of students taught at the same time. In this manner, terrain models with photographic detail projected onto their surfaces provide visualizations of actual land areas and serve as an effective training and briefing medium for the students. The device has special application for pilots and for amphibious force military personnel.

The structure of the invention comprises an orthographic projection system providing acceptable pictorial detail and increased accuracy in transferring two-dimensional map, photo-mosaic, or other orthographic information onto three-dimensional terrain models or other relief surfaces through photographic projection.

Referring to Figure 1, the invention is designated as a whole at 10 and includes an illumination assembly 12, a transparency turntable assembly 14, a model turntable assembly 18 in spaced relation to the transparency turntable assembly 14, and an optical projection assembly 16 located between the transparency turntable and the model turntable assemblies.

The transparency turntable and model turntable assemblies are rotatable about their centers and at equal angular speeds, while the illumination assembly and the optical projection assembly move in parallel straight lines at equal linear speeds from positions on the rotation centers respectively of the transparency turntable and model turntable assemblies to positions at their respective peripheries. Thus the entire surfaces of the transparency and the model may be scanned by the radial motion of the optical projection assembly advancing the width of its scan for each rotation of the transparency and model in a spiral pattern, whose successive sweeps are contiguous. A common shaft 20 is provided to drive the orthoprojector assemblies and is connected to a source of power.

As is shown in Figs. 1 and 2, the illumination assembly 12 provides a collimated light beam capable of providing sufficient illumination for photographic exposures of reasonably short duration.

Lamp housing 24 is provided with suitable lenses designed to collect the rays of light from a lamp 28 and to transmit the light as a narrow beam. Lamp housing 24 is adjustable at 25 to vary the distance between lenses 26 and may contain a reflector 30, if desired. A hollow tubular support and guide 32 is internally threaded to receive a worm 34, as shown in Fig. 2 and sleeves 36 and 38 are affixed to lamp housing 24. Sleeve 36 includes a pin 40 extending into a slot on worm 34 to carry lamp housing 24 in a linear path of travel. Sleeve 38 receives therethrough cable 44 supported at each extremity at 46. Cable 44 supports lamp housing 24 during linear travel thereof. Bevel or pinion gear 48 is fixed on worm 34. Spur gear 50 on shaft 20 cooperates with a second spur gear (not shown) which, in turn, rotates pinion gear 51 on driven shaft 53 to actuate pinion gear 48. Obviously other equivalent structures may be used, if desired.

Transparency turntable assembly 14 comprises a glass pressure plate 52 retained in an annular plate 54 containing gear teeth 56 adapted to mesh with drive gear 58 secured on shaft 20. A transparency 59, to be reproduced, is placed on turntable assembly 14 between plates 52 and 54 beneath illumination assembly 12. A non-rotatable light shield 60 is mounted in the device and overlies glass plate 52. Light shield 60 comprises two hemispherical disks 61 and 63 rotatably pivoted about pin 65 with disk 63 rotatably slidable beneath disk 61 to provide a triangular exposure slot of selected angular width. In this manner, transparency 59 is held firmly under plate 52 and, by rotation of the turntable, is sequentially exposed through the triangular slot.

Directly below transparency turntable assembly 14 is secured a diaphragm exposure ring 62 extended laterally from sleeve 64. Generally, diaphragm ring 62 is not needed, since the device will transfer the image adequately. However, when there is some exposure variation, the diaphragm ring is effective to avoid such effect. Sleeve 64 is internally threaded and includes pin 66, similar to pin 40, for engagement in groove 68 in worm 69. Gears 70 and 72 actuate the exposure ring to travel in synchronization with lamp assembly 24. The construction of the exposure spot diaphargm is designed so that there will be minimum exposure variation within and between each of the successive sweeps of the orthoprojector.

The optical projection assembly 16 is mounted in spaced alignment with the illumination system 12. The depth of focus, diameter of field, resolution in plane of optimum focus and at limits of depth of field, as required for the purposes of a given instrument are all provided by computations conventional in optical engineering, and forms no part of the disclosure.

To aid in extending flexibility of the instrument for these computations, the projection lens aperture is adjustable and may be supplied with a suitable scale to indicate the lens opening. The construction of the optical projection assembly, in a preferred form, comprises a housing 74 mounted in the device in a manner similar to the illumination assembly. Housing 74 retains the projection lenses 76 and the erecting prism means 78 for transferring the information from the transparency on the model turntable. The specific structural details are well known in the art and need no further explanation. The projection assembly is retained on worm guide 80 retained in a support 82 which is rotated by means of bevel gears 84 and 86.

Spaced beneath the optical projection assembly is the model turntable assembly 18 comprising a turntable 88 provided with gear teeth at the peripheral surface to be engaged and rotated by gear 90 on shaft 20 which is driven by gear 92 supported on drive shaft 94 of motor 22. A model 93 is placed on turntable 88 to receive the projection of the image from transparency 59.

When required, a fixed light shield 96, similar to shield 60, comprises two hemispherical disks 97 and 99, pivoted at 98 with one disk rotatably slidable beneath the other, such adjustment providing a triangular exposure slot 101 of selected size to control the scanning area exposed for optimum results.

It is desirable to avoid overlap between sweeps in order to obtain an image with complete absence of indication of its spiral path. Since lamp means 12 moves linearly with worm 34 as turntable 52, carrying the transparency is rotated, the surface scanned for transfer to the model turntable below is in an ever-widening spiral pattern whose successive sweeps are contiguous or slightly overlapping. It is obvious therefore, that linear travel of the illumination means from the axis of the turntable to the periphery thereof provides less exposure time as the periphery is approached if no masking of the field is used and if radial and angular speeds are constant. This is compensated for by the triangular shape of the exposure slot. The divergent angle formed, radiating outwardly from the axis of the turntable, provides a shorter exposure linear arc adjacent the center of the turntable than at the periphery. This compensates for the slower linear speed of rotation at the center of a plate than at the outer periphery and provides a uniform exposure time for the transparency from the center to the periphery.

However, in any field, the greatest light intensity is at its center. The V-slot in the hemispherical shields described above does not affect this fact. Such sinusoidal unevenness may be corrected by using a transmission control filter disk 100 fitted into the exit end of lamp housing 24. Filter disk 100 is of graduated density, as is illustrated in Figures 5 and 6, with the darkest area near the central axis thereof to help equalize the intensity in a section across the sweep. If no filter were used and it were desired to obtain an even illumination across the section, it would be necessary to adjust the scanning sweep overlap to take advantage of the sinusoidal variation across the section by assuring addition of intensity between two sweeps where the intensity falls to a value visually detectable.

In operation as a photographic orthoprojector, a photo sensitized model 93 is placed on plate 88, and a transparency 59, at the same scale as the model, and containing the information to be orthographically projected onto the model, is placed on plate 54 in position for orthographic point-for-point correspondence between the two. The model and the transparency are centered with respect to the center of rotation in order to minimize the number of sweeps necessary for exposure. Glass plate 52 presses the transparency flat. The illumination assembly 12 and the optical projection assembly 16 are axially aligned and, at the start of the operation, overlie either the center of rotation of transparency assembly 14 and model assembly 18, respectively, or corresponding points of their peripheries. The exposure required is adjusted by varying the drive speed, by varying the aperture of the optical projection assembly, by controlling the width of the exposure masking slot, by varying the intensity of light, or by a combination of the above factors. The optimum operating conditions are determined by known optical factors in the photographic art.

After the proper exposure has been adjusted, motor 22 is actuated by a switch (not shown) to rotate shaft 20. The gears on shaft 20, cooperating with the gear means of the various assemblies, enable turntables 54 and 88 to rotate, while worms 34, 69, and 80 rotate to enable illumination assembly 12, exposure ring 62, and optical projection assembly 16, respectively, to travel radially. Scanning of the model takes place in successive sweeps, until the entire surface of the model on the turn-table has been exposed, after which the operation is cut off by a micro-switch (not shown).

Obviously, with the above illustrative description, alternate methods of construction and operation within the scope of the invention become readily apparent.

An alternate form of optical projection assembly is illustrated schematically in Figure 7. Here, a telecentric lens assembly is arranged for 1:1 magnification between the transparency and the model.

A spherical reflector 110 is provided for a light source 112 with the illumination collected by a condensing lens system 114 and is transmitted through projection lenses 116 and 118 to the model 120. Transparency 122 is positioned between lens system 114 and projection lens 116 so that the distance from transparency 122 to lens 116, and the distance from lens 116 to lens 118 are equal. Thus, a 1:1 magnification between the transparency and model is retained. In this form, the exposing beam is more truly collimated since the distance from 116 to 118 is the focal length of 118 and is twice the focal length of 116.

Other arrangements suggest themselves. Another method construction provides a beam of light, closely parallel transmitted by a lens positioned for 1:1 magnification. Alternately, a collimated beam may be obtained by the use of a parabolic reflector with a concentrated light source placed at its focus. In this form, the transparency is shadowed upon the model, rather than having the image formed thereon optically. A light source, rather than an optical assembly would be required.

Obviously many modifications and variations of the present invention are possible in the light of the above teachings. It is therefore to be understood that within the scope of the appended claims the invention may be practiced otherwise than as specifically described.

What is claimed is:

1. The method of transferring a two dimensional view onto a three dimensional model comprising aligning a transparency containing the view in spaced relation to a photo-sensitive model, rotating the transparency and model, projecting the transparency through an optical projection assembly to the model, illuminating the transparency, progressively scanning the transparency and model with the optical projection assembly to transfer the two dimensional view onto the model, and illuminating the optical projection assembly to project the transparency onto the model by a collimated beam of light to obtain a beam of high resolution with equal area sections for the view through the required depth of field.

2. A photographic orthoprojector comprising a first support to retain a transparency, a second support spaced from said first support to retain a three dimensional photo sensitive model, means engaging said supports and rotating them in unison, scanning means overlying each of said supports, and means operatively coupled to said scanning means to cause the scanning means to traverse the model linearly to print a two-dimensional view from the transparency onto the three dimensional photo sensitive model.

3. A photographic orthoprojector comprising a light source, a transparency holder illuminated by said light source, a three dimensional model plate spaced from said transparency holder, an optical projection assembly mounted between said transparency holder and said model plate, and actuating means operatively coupled to said orthoprojector elements to move said holder and plate relative to the light source and optical projection assembly to cause the optical projection assembly to scan the transparency holder and model plate to print a two dimensional image on a three dimensional model.

4. A photographic orthoprojector comprising a light source, a transparency holder illuminated by said light source, a condensing assembly mounted between said light source and transparency holder to provide a narrow light beam, a model plate spaced from said transparency holder, an image plate spaced from said transparency holder, an optical projection assembly mounted between said transparency holder and said model plate, means to linearly scan said condensing assembly and optical projection assembly over the transparency holder and plate respectively, and means to rotate said transparency holder and model plate in unison.

5. The combination of claim 4, wherein said orthoprojector includes a spot diaphragm providing uniform exposure mounted beneath and axially aligned with the transparency holder.

6. The combination of claim 4, wherein a filter to prevent sinusoidal unevenness of light intensity is mounted in said orthoprojector.

7. A photographic orthoprojector comprising a light source, a transparency holder illuminated by said light source, a model plate spaced from said light source, optical means mounted adjacent said plate, means secured on said transparency holder to mask the light overlying said transparency holder, means to move synchronously said light source and optical means to scan the transparency holder and model plate respectively to print a two dimensional image onto a three dimensional model, and filter means mounted adjacent said light source to minimize visible evidence of sequential exposure in said scanning movement by equalizing the intensity in a section across the sweep.

8. A photographic orthoprojector comprising a light source, a transparency holder illuminated by said light source, a model plate spaced from said light source, means simultaneously rotating said transparency holder and said model plate, optical means mounted adjacent said model plate, means moving said light source and projection means linearly whereby the transparency holder and model means respectively are scanned, and light masking means secured on said transparency holder and on said model plate.

9. The combination of claim 8, wherein said masking means comprises a pair of sections of disks and means pivotally securing said disks in superimposed relation so that a disk is rotatively slid under the other to provide a triangular slot of predetermined size.

10. The combination of claim 9, wherein a filter disk is secured above said transparency holder to minimize visible evidence of overlap in scanning by equalizing the intensity in a section across the sweep.

11. The combination of claim 10, wherein a diaphragm ring is mounted in spaced parallel position adjacent said transparency holder and travels synchronously with said light source to avoid exposure variation.

12. A photographic orthoprojector comprising a light source, a transparency holder mounted beneath said light source, a model holding member mounted beneath said transparency holder, optical means mounted between said transparency holder and model holding member; said light source, transparency holder, model holding member and optical means being axially aligned, and single drive means rotating said transparency holder and model holder while simultaneously moving said optical and lens systems linearly.

13. A photographic orthoprojector comprising a light source, a transparency holder mounted beneath said light source, a model holding member mounted beneath said transparency holder, optical means mounted between said transparency holder and model holding member; said light source, transparency holder, model holding member and optical means being axially aligned, and single drive means rotating said transparency holder and model holder while simultaneously moving said optical and lens systems linearly, said transparency holder and model holder each including plates having V-shaped slots, said plates being adjustably secured in said holders to vary the angles of the slots.

14. A photographic orthoprojector comprising a light source, a transparency holder mounted beneath said light source, a model holding member mounted beneath said transparency holder, optical means mounted between said transparency holder and model holding member; said light source, transparency holder, model holding member and optical means being axially aligned, and single drive means rotating said transparency holder and model holder while simultaneousy moving said optical and lens systems linearly, said transparency holder and model holder each including plates having V-shaped slots, said plates being adjustably secured in said holders to vary the angles of the slots, and said V-shaped slots extend from the axes of the holders radially to the peripheral edges thereof whereby the differences in exposure time from the axes to the peripheries of the holders is compensated for.

15. A photographic orthoprojector comprising a light source, a transparency holder mounted beneath said light source, a model holding member mounted beneath said transparency holder, optical means mounted between said transparency holder and model holding member; said light source, transparency holder, model holding member and optical means being axially aligned, and single drive means rotating said transparency holder and model holder while simultaneously moving said optical and lens systems linearly, said light source including a filter disk mounted between said light source and said transparency holder, said filter disk being of graduated density to provide illumination intensity adjustment.

16. A photographic orthoprojector comprising a light source, a transparency holder mounted beneath said light source, a model holding member mounted beneath said transparency holder, optical means mounted between said transparency holder and model holding member; said light source, transparency holder, model holding member and optical means being axially aligned, and single drive means rotating said transparency holder and model holder while simultaneously moving said optical and lens systems linearly, said light source including a filter disk mounted between said light source and said transparency holder, said filter disk being of graduated density to provide illumination intensity adjustment, said light source including sleeve means secured thereto, a worm shaft extending through said sleeve means, and a tubular support secured to said drive means and receiving said shaft to move said light source linearly.

17. A photographic orthoprojector comprising a light source, a transparency holder mounted beneath said light source, a model holding member mounted beneath said transparency holder, optical means mounted between said transparency holder and model holding member; said light source, transparency holder, model holding member and optical means being axially aligned, and single drive means rotating said transparency holder and model holder while simultaneously moving said optical and lens systems linearly, said light source including a filter disk mounted between said light source and said transparency holder, said filter disk being of graduated density to provide illumination intensity adjustment, said optical means including sleeve means secured thereto, a worm shaft extending through said sleeve means, and a tubular support secured to said drive means and receiving said shaft to move said light source linearly.

18. A photographic orthoprojector comprising a light source, a transparency holder mounted beneath said light source, a model holding member mounted beneath said transparency holder, optical means mounted between said transparency holder and model holding member; said light source, transparency holder, model holding member and optical means being axially aligned, and single drive means rotating said transparency holder and model holder while simultaneously moving said optical and lens systems linearly, said orthoprojector including a diaphragm exposure ring mounted between said transparency holder and said optical means to provide minimum exposure variation during and between each of the successive sweeps of the orthoprojector.

References Cited in the file of this patent
UNITED STATES PATENTS

| | | |
|---|---|---|
| 1,344,896 | Jobke | June 29, 1920 |
| 1,844,162 | Hirsch | Feb. 9, 1932 |
| 1,963,079 | Duke | June 19, 1934 |
| 2,032,397 | Brady | Mar. 3, 1936 |
| 2,309,627 | Cooke | Feb. 2, 1943 |
| 2,309,752 | Cooke | Feb. 2, 1943 |
| 2,464,793 | Cooke | Mar. 22, 1949 |
| 2,549,699 | McLaughlin | Apr. 17, 1951 |
| 2,643,576 | Merriam | June 30, 1953 |